United States Patent [19]

Wells

[11] 3,780,841
[45] Dec. 25, 1973

[54] VARIABLE AUTOMATIC TRANSMISSION

[76] Inventor: William T. Wells, 1750 W. Ajo Way, Tucson, Ariz. 85713

[22] Filed: Aug. 3, 1972

[21] Appl. No.: 277,911

[52] U.S. Cl. .................................................. 192/61
[51] Int. Cl. .......................................... F16d 31/04
[58] Field of Search ......................... 74/794; 192/61

[56] References Cited
UNITED STATES PATENTS

| 2,311,237 | 2/1943 | Loveday | 192/61 |
| 2,644,561 | 7/1953 | Dikeman | 192/61 |
| 2,652,911 | 9/1953 | Somers | 192/61 |
| 2,839,889 | 6/1958 | McGill | 192/61 X |
| 3,234,822 | 2/1966 | Young | 74/794 X |
| 3,252,554 | 5/1966 | Baier | 192/61 |

Primary Examiner—Charles J. Myhre
Assistant Examiner—Thomas C. Perry
Attorney—H. Gordon Shields

[57] ABSTRACT

An automatic transmission is disclosed which changes the ratio of gearing between a driving member and a driven member by the use of hydraulic pumps to provide virtually unlimited variable gear ratios.

6 Claims, 4 Drawing Figures

VARIABLE AUTOMATIC TRANSMISSION

BACKGROUND OF THE INVENTION

1. Field of the Invention

This invention relates to transmission apparatus wherein the gear ratio between the driving member and a driven member is changed, and more particularly, to an automatic transmission in which hydraulic pump action is used to vary the gear ratios between the driving and the driven members over a wide range of ratios and without fixed gear ratios.

2. Description of the Prior Art

A transmission is essentially a gear reducing apparatus in which the gearing ratios between a driving and a driven member are changed as desired. In automatic transmissions, as for example, used in automotive vehicles, the gear ratios are changed automatically in fixed gear ratios. That is, a series of fixed gears are changed automatically according to a predetermined parameter, such as engine speed. Such automatic transmissions are characterized by many moving parts which are required to change the ratios. With many moving parts, wear is often a substantial problem. Moreover, the speed of the engine is very important in such automatic transmissions. That is, as engine RPM increase, the ability of an automatic transmission to change gear ratios between high RPM driving members and driven members decreases.

Recent advancements in the development of rotary combustion engines, in which the driving member rotates at about twice the RPM of the rotating member, have redefined requirements for automatic transmissions. The automatic transmissions so prevalent in use today in automatic vehicles of the reciprocating piston type cannot operate at the high RPM requirements of such rotary combustion engines.

Another problem extant in the prior art is the heating of the transmission fluid and the requirement for cooling the heated fluids. As engine RPM increase, the pumping medium, or hydraulic fluid, heats up and the heat must be dissipated in order for the transmission to operate properly. This in turn requires some cooling apparatus, such as a heat exchanger in the form of a radiator, for the transmission fluid.

Another problem involved in the prior art automatic transmissions is a wear factor. With many, many moving parts, it is obvious that wear is a problem. That is, during the normal course of operation of an automatic transmission, there is a substantial amount of wear of the moving parts. Periodically, such parts need to be replaced and/or adjusted in order to optimize the performance of the transmission.

The above noted deficiencies of the prior art are obviated by the present invention in which a minimum of moving parts is required, thus reducing the wear of the transmission, and the problem of cooling transmission fluid is also obviated by the manner in which the hydraulic fluid is circulated.

SUMMARY OF THE INVENTION

This invention comprises an automatic transmission in which the gear ratio between a driving member and a driven member is changed or varied according to hydraulic action utilizing a hydraulic pump or a plurality of pumps between the driving member and the driven member. One element of the hydraulic pump is secured to the driving member and the other unit of the pump is secured to the driven member. By controlling the flow of the pumping medium, or the hydraulic fluid, the relation between the two elements of the pump is controlled from zero through a virtually limitless ratio until a one to one ratio between the members is achieved.

Among the objects of the present invention are the following:

to provide a new and useful transmission apparatus;
to provide a new and useful automatic transmission apparatus;
to provide new and useful automatic transmission apparatus in which a minimum of moving parts is used;
to provide a new and useful transmission utilizing hydraulic pump action;
to provide a new and useful transmission in which reverse operation is accomplished by hydraulic action;
to provide a new and useful automatic transmission capable of changing a gear ratio between a driving member and a driven member;
to provide a new and useful transmission for varying the ratio between the driving member and the driven member over a wide range of variations.

BRIEF DESCRIPTION OF THE DRAWING

FIG. 4 is a continuation of FIG. 3.

DESCRIPTION OF THE PREFERRED EMBODIMENT

The variable automatic transmission of the present invention comprises essentially a power input member providing power for a plurality of fluid pumps, and the output from the fluid pumps being used to power an output member. That is, the driving member provides motive force for a number of fluid pumps and the driven member is coupled to a rotor moved by the fluid pressure, or hydraulic pressure, provided by the fluid pumps.

Figure 1:
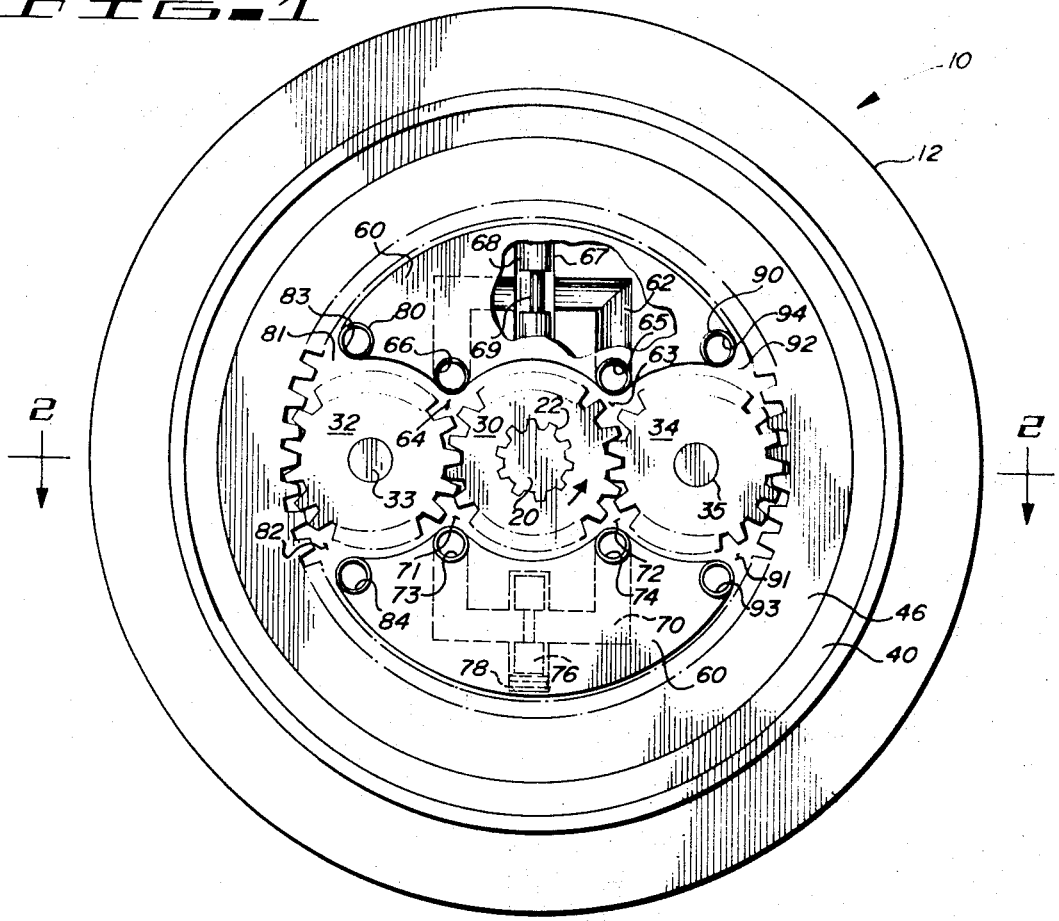
FIG. 1 is a view in partial section through apparatus embodying the present invention.

The transmission apparatus is illustrated in FIG. 1, which comprises a view in partial section of transmission apparatus embodying the present invention.

Transmission apparatus 10 includes a housing 12 which surrounds and encases an input shaft or driving member 20 and a driven member 40. The driven member 40 is secured to an internal gear 46.

The driving member or input shaft 20 includes a plurality of axially extending splines 22 which mesh with internal splines in a drive gear 30. Drive gear 30 in turn meshes with a pair of idler gears 32 and 34 which are journalled for rotation within an inner rotating member or rotor 60 by a pair of shafts 33 and 35, respectively. The gears 32 and 34 are located diametrically opposite each other with respect to shaft 20. The idler gears 32 and 34 in turn mesh with internal gear 46.

The gearing system together with a fluid passage or conduit system comprises four hydraulic pumps, the output of which is used to transform rotation of shaft 20, the driving member, into rotation of driven member 40. The rotation of driven member 40 is accomplished through movement of the inner rotating member 60 and internal gear 46.

The inner rotating member or rotor 60 includes a fluid passage or conduit 62 which extends between chambers 63 and 64. Inlet 65 of conduit 62 opens to chamber 63 and outlet 66 of fluid passage 62 communicates with chamber 64. Fluid passage or conduit 70 extends between chamber 71 and chamber 72, with inlet 73 of conduit 70 communicating with chamber 71 and outlet 74 of the conduit communicating with chamber 72.

Each of the fluid passages 62 and 70 includes a cross chamber which extends radially and diametrically opposite each other with respect to shaft 20. Cross chamber 67 of fluid passage 62 is shown in FIG. 1 by breaking away a portion of inner rotating member 60. The cross chamber 67 diametrically across fluid passage 62. A restrictor 68 is located within the cross chamber and it extends radially with respect to the center of rotation of shaft 20. The restrictor includes a relieved portion 69. Maximum flow through fluid passage 62 is provided when the relieved portion 69 of the restrictor 68 is lying diametrically across the passage 62. As the relieved portion is moved out of the passage 62 fluid flow through the passage is blocked by restrictor 68. Movement of restrictor 68, and a corresponding restrictor 76 in a cross chamber in fluid passage 70 varies with the speed of the engine and of the rotating member or rotor 60 and the bias of compression springs, such as spring 78 on restrictor 76. The position of the restrictors controls the flow of fluid through the passages.

Assuming a counterclockwise rotation of shaft 20 and of drive gear 30 splined thereto, as indicated by the arrow in FIG. 1, the operation of the transmission in a forward drive would be accomplished in the following manner. The meshing of drive gear 30 with idler gears 32 and 34 creates a positive pumping action in chambers 63 and 71, which, with the respective adjacent meshing gears, define the inner pumps. The pressure of the fluid is directed against the adjacent portions of the inner rotating member or rotor 60, with a portion of the fluid within each of the chambers flowing through their respective fluid passages 62 and 70. Thus fluid would move from chamber 63 through inlet 65 and through fluid passage 62 and outlet 66 to chamber 64, while fluid moves from chamber 71 through inlet 73, fluid passage 70, and outlet 74 to chamber 72. At the same time, the meshing of idler gears 32 and 34 with internal gear 46 would similarly result in a fluid pumping action of fluid chambers 81 and 91. The output of the pumping action of the other pumps, as defined by chambers 81 and 91 with their respective adjacent meshing gears, will be discussed in conjunction with FIGS. 2–4. The pumping action of the outer pumps does not cause any reaction when in forward drive. The only reaction is produced when the apparatus is in reverse and when the rotor 60 is clamped to the housing, as will be explained in detail below.

As the speed of shaft 20 increases, the output of the fluid pumps also increases. Passages 62 and 70 are calibrated to handle the output for the circulation of the hydraulic fluid medium as it is being pumped between the respective chambers up to certain predetermined differential pressure of flow limits. Above these limits the passages are inadequate to allow the free passage of the hydraulic medium. At this point the rotor 60 tends to follow the rotational movement of shaft 20 and drive gear 30 in their counterclockwise rotation, thus maintaining the pressure or flow differential. As rotor 60 begins to rotate, centrifugal forces cause the restrictors 68 and 76 to move radially outwardly, further restricting the movement of the hydraulic fluid through passages 62 and 70, respectively. The movement of the fluid through the passage is further restricted as the restrictors move outwardly by the displacement of the relieved portions of the restrictors away from the respective passages. At a predetermined RPM, controlled by the compression springs, which are preferably adjustable within the rotor, as by adjustable set screws, the passages 62 and 70 are substantially completely closed thus preventing the movement of the fluid between chambers 63 and 64 and 71 and 72, respectively. When this occurs, the idler gears 32 and 34 become relatively immovable on their shafts 33 and 35, respectively, which thus prevents any rotational movement between input shaft 20, rotor 60, and internal gear 46 and the output member 40 connected thereto. This in turn results in a direct drive situation between the input or driving shaft 20 and the rotor 60, the gear 46 and output member 40. The output member 40, the driven member, thus varies from zero RPM to the speed of the driving member, or input shaft 20, not in the stepped manner of normal gear changing, but rather in the virtually infinitely variable manner of a closing hydraulic valve.

It will be noted that when the transmission is in a direct drive situation, the idler gears 32 and 34 are not moving relative to internal gear 46 and accordingly there is no hydraulic fluid pump action at chambers 81 and 82 at idler gear 32 and chambers 91 and 92 at idler gear 34.

Figure 2:
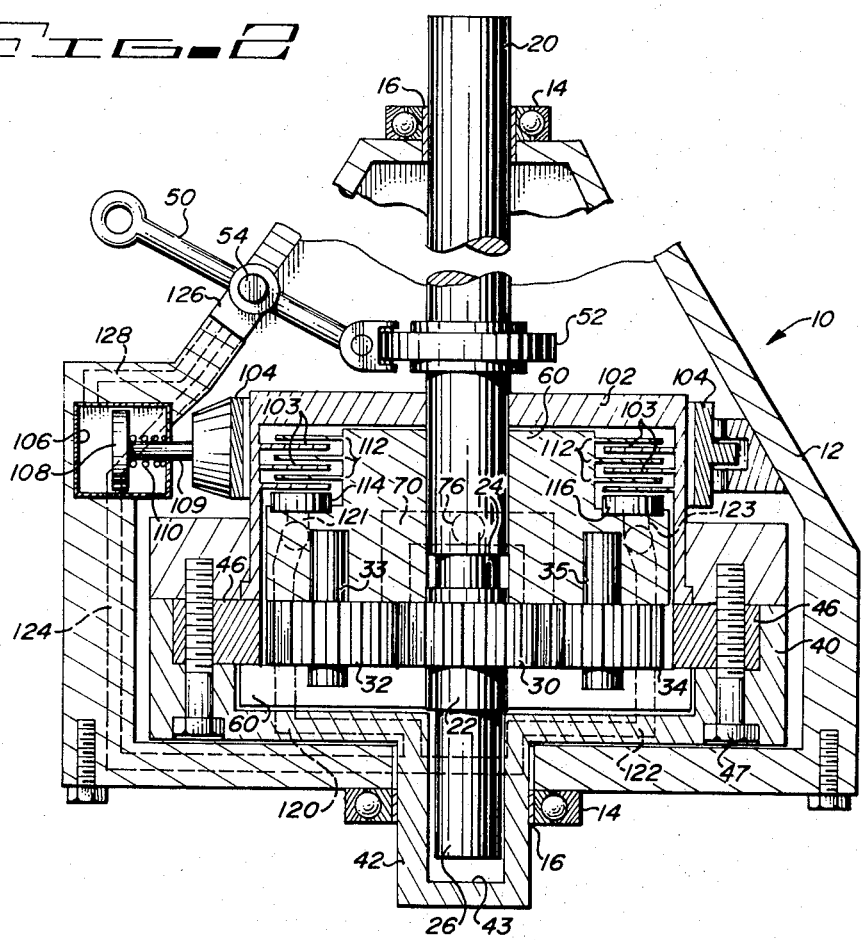
FIG. 2 is a view of apparatus of FIG. 1 taken along line 2—2 of FIG. 1.

FIG. 2 comprises a vertical view in partial section of the apparatus of FIG. 1 taken generally along line 2—2 of FIG. 1. The figure discloses automatic transmission 10 which is enclosed in a housing 12. Input shaft or driving member 20 is journalled for rotation through housing 12 by a bearing means 14 and appropriate seal means 16. Driven member 40 includes an output shaft or power takeoff member 42 which is similarly journalled for rotation through housing 12 in similar bearing means 14 and it is also appropriately sealed as at 16. The output shaft or power takeoff member 42 is generally cylindrical in configuration externally of housing 12 and it defines cylinder chamber 43.

Input shaft 20 includes a plurality of axially extending splines 22 and a groove 24 adjacent the splines 22. The splines mate with splines of drive gear 30 (see FIG. 1). An unsplined extension 26 of shaft 20 extends into cylinder chamber 43 of output shaft 42. Driven member 40 is secured to internal gear 46 by appropriate fastening means 47. Accordingly, movement of internal gear 46 results in corresponding movement of driven member 40 and its power takeoff or output shaft 42. Idler gears 32 and 34 are journalled for rotation on their respective shafts 33 and 35 within inner rotating member 60. The idler gears also mesh with internal gear 46. Fluid passage or conduit 70, and restrictor 76 therein, are shown by dotted lines.

A shift lever 50 extends from externally of the housing 12 to a yoke 52 secured to shaft 20. The shift lever 50 moves about a pivot 54 in the transmission housing. Movement of the shift lever results in axial movement of shaft 20 to engage or disengage the splines 22 on shaft 20 with drive gear 30 and also to position groove 24 with respect to a fluid by-pass system for fluid passages 62 and 70. The latter will be discussed more in detail with respect to FIG. 3. With the splines 22 of shaft 20 completely disengaged from drive gear 30, the transmission will be in a neutral state. At this time, unsplined extension 26 of shaft 20 will extend through drive gear 30. With the splines 22 engaged with drive gear 30, but with groove 24 of shaft 20 aligned with the fluid by-pass system, the transmission will be in reverse.

Within housing 12 and disposed about the inner rotating member or rotor 60 is a reverse drum 102. On the inside or inner periphery of the reverse drum, which is generally cylindrical in configuration, is a plurality of drum plates 103. The drum plates are appropriately secured to the reverse drum and are coaxial with shaft 20. The reverse drum is appropriately journalled for rotation within housing 12 and about the rotor 60.

Disposed about the external periphery of reverse drum 102 and secured to housing 12 is a reverse band 104. The reverse band 104, while secured to the housing 12, is movable, but not rotable, therein. The reverse band includes a cylinder 106 in which is disposed a piston 108. A piston rod 109 extends between the piston 108 and the reverse band 104 to which the piston rod is secured. Hydraulic pressure within cylinder 106 moves the piston 108 and piston rod 109 and reverse band 104 to clamp the band against reverse drum 102. In this manner the reverse drum and the reverse band are locked together in a nonrotable configuration with respect to reverse drum 102. The reverse band is urged out of engagement with reverse drum 102 by a compression spring 110 within cylinder 106 about piston rod 109. Thus when fluid pressure within cylinder 106 is relieved, the bias of spring 110 moves the piston within the cylinder and thus withdraws the reverse band from engagement with reverse drum 102.

Inner rotating member of rotor 60 includes a plurality of clutch plates 112 which are also coaxial with shaft 20 and are interleaved between drum plates 103 of the reverse drum 102. The rotor 60 also includes a cylindrical recess 114 into which is disposed a toroidal piston 116. When fluid pressure is applied to toroidal piston 116 the piston bears against the drum plates 103 moving them into engagement with the clutch plates 112. The drum plates and the clutch plates are both movably splined as is well known in the art. When the clutch plates and the drum plates are thus engaged, relative motion between rotor 60 and reverse drum 102 is prevented.

Fluid pressure for actuating the toroidal piston 116 is provided from fluid passages of conduits 80 and 90 (see FIGS. 1 and 3) by conduits 121 and 123, respectively. Fluid pressure for actuating piston 108 is also provided from fluid passages 80 and 90 by conduits 120 and 122 respectively. Conduits 120 and 122 join to become conduit 124. A valve 126 is located adjacent to, and is actuated by, shift lever 50. When shift lever 50 is moved in reverse position, the valve 126 is opened which allows fluid pressure from conduit 124 to flow to cylinder 106 through conduit 128. This fluid pressure within cylinder 106 actuates piston 108 to move reverse band 104 into clamping engagement with reverse drum 102, thus preventing rotational movement of the reverse drum. At the same time, fluid pressure through conduits 121 and 123 moves piston 116 into engagement with drum plates 103 which in turn are moved into engagement with clutch plates 112. With the engagement of clutch plates 112 and drum plates 103, relative motion between rotor 60 and reverse drum 102 ceases. Since reverse drum 102 is locked in place by reverse band 104 and accordingly prevented from moving, the rotor 60 is now coupled to the reverse drum and is accordingly also prevented from moving.

During forward motion of the transmission, gears 32 and 34 were idler gears but they are now fixed in place since they are mounted within rotor 60. Accordingly, movement of drive shaft 20 in one direction will now result in movement in the opposite direction of internal gear 46 and thus of the driven member 40 which is secured thereto.

In order for the pumping action of chambers 63, 64, 71, and 72 (see FIG. 1) to become neutralized, a by-pass system for allowing complete circulation or complete movement of the fluid between respective chambers is utilized. The by-pass system is actuated by aligning groove 24 on shaft 20 with fluid by-pass conduits of passages 62 and 70 when the shift lever 50 is moved to the reverse position. Thus with the inner pumps neutralized, or the pumps defined by chambers 63, 64, 71, and 72 and their respective gears 30, 32, and 34, the outer pumps, those defined by gears 32, 34, and the internal gear 46 and chambers 81, 82 and 91, 92, are thus utilized to cause rotation of inner gear 46 and of the driven member 40 which is secured thereto.

As shaft 20 rotates, in the counterclockwise direction as previously discussed and as indicated by the arrow, the gears 32 and 34 which mesh therewith are also moved. Since they are fixed in place now with respect to the housing 12 because the rotor 60 is now in place stationary with respect to the housing, movement of gears 32 and 34 results in movement of the internal gear 46 in a direction which is clockwise or the reverse of the rotational movement of shaft 20 and of drive gear 30 secured thereto.

When gears 32 and 34 mesh with internal gear 46, and more relative thereto, there is a flow of hydraulic fluid under pressure from chamber 81 through inlet 83 to fluid passage 80 and through outlet 84 to chamber 82. Similarly, there is a flow of pressurized fluid from chamber 91 through inlet 93, fluid passage 90, and through outlet 94 to chamber 92. As previously indicated, the fluid passages 80 and 90 are connected to conduits 120, 121, 122 and 123 to provide pressure for actuating pistons 102 and 116.

Figure 4:
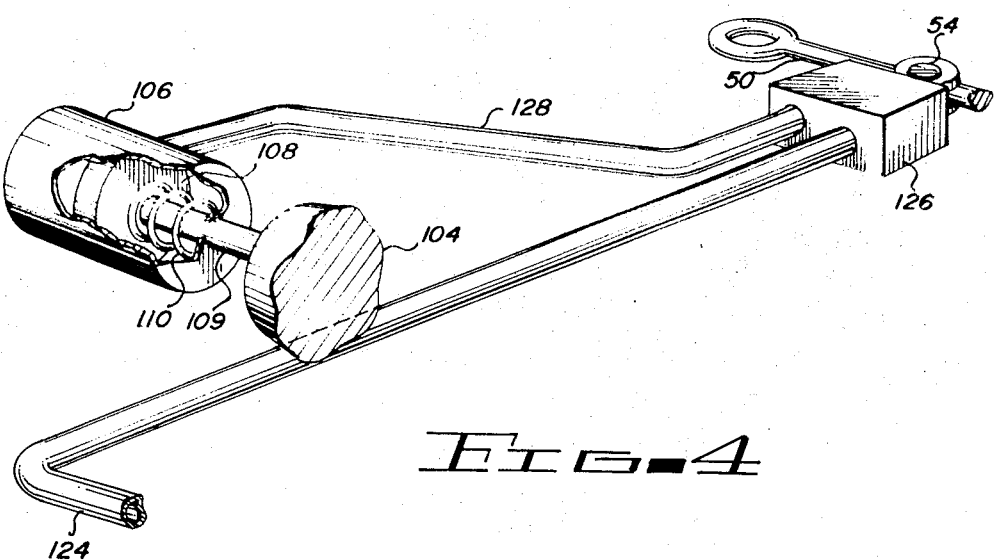
FIGS. 3 and 4 are schematic representations of the fluid pressure and transfer lines for the apparatus of the present invention.
Figure 3:
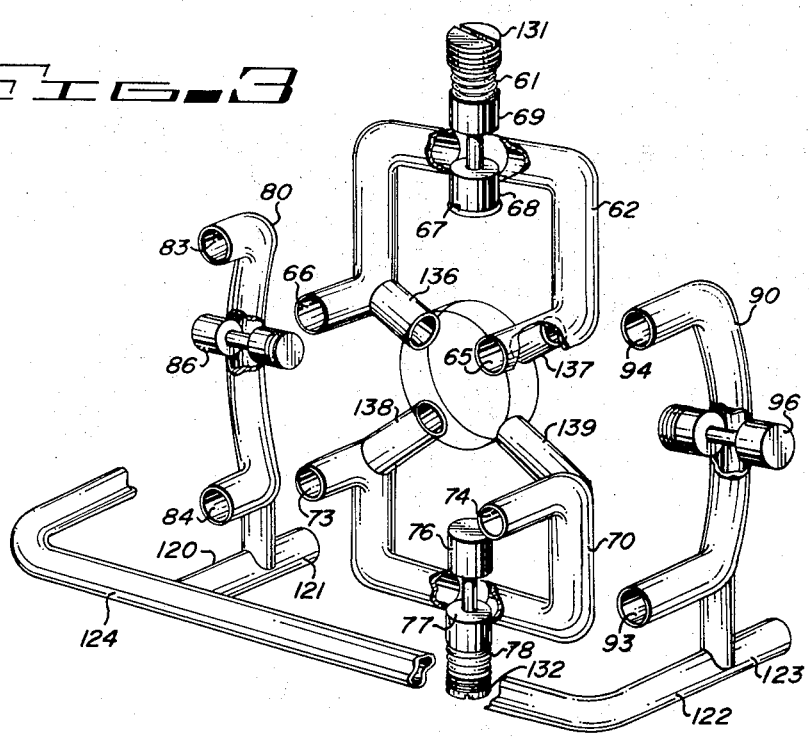

The hydraulic system is illustrated schematically in FIGS. 3 and 4. Fluid passage 62 is shown with its inlet 65 and its outlet 66, which communicate respectively with chambers 63 and 64 (see FIG. 1). Cross chamber 67 also is illustrated with restrictor 68 disposed therein. A compression spring 61 biases the restrictor 68 against centrifugal force when the apparatus is rotating so as to allow relieved portion 69 of the restrictor 68 to overly the passage 62. As centrifugal force increases with increased rotational speed, restrictor 68 moves against compression spring 61 to move relieved portion 69 out of engagement with passage 62 and thus restrict the flow of fluid through passage 62. An externally threaded set screw 131 is shown disposed against spring 61. By adjusting the set screw 131, (in the rotor 60) the bias of spring 61 against restrictor 68 may be varied as desired.

Fluid passage 70 is also illustrated with its inlet 73 and outlet 74 and its restrictor 76 extending across the passage. A compression spring 78 is shown disposed against the restrictor 76 urging the restrictor inwardly against the outward centrifugal force when the apparatus is rotating. An adjustable set screw 132 is shown adjacent spring 78. Relieved portion 77 allows movement of the fluid through passage 70 and, when the relieved portion is moved out of alignment with passage 70 due to movement of restrictor 76, the flow of fluid through passage 70 is restricted, as previously discussed.

By-pass conduits 136 and 137 extend from fluid passage 62 radially inwardly, and by-pass conduits 138 and 139 extend from fluid passage 70 also radially inwardly. When shaft 20 is moved to the reverse position, the groove 24 thereon (see FIG. 2) communicates with the by-pass conduit 136, 137, 138, and 139 to allow unrestricted circulation of the fluid within the respective passages 62 and 70. This unrestricted passage of fluid thus effectively neutralizes the inner pumps defined by chambers 63, 64, 71, and 72, and their respective gears (see FIG. 1.).

Fluid passages 80 and 90, with their inlets 83 and 93, and outlets 84 and 94, respectively, are also illustrated in FIG. 3. A restrictor 86 is disposed perpendicular to and intersecting passage 80 and a restrictor 96 is disposed perpendicular to and intersecting passage 90. The restrictors include relieved portions which function in a manner similar to that of restrictors 68 and 76 and passages 62 and 70. However, the restrictors 86 and 96 are not actuated by centrifugal force but rather are adjustable in a preset manner with rotor 60 by co-operating threads on the restrictors and in the rotor 60.

Fluid conduits 121 and 123 extend from passages 80 and 90, respectively, to cylinder recess 114 and they provide hydraulic pressure for actuating piston 116 (see FIG. 2). Fluid conduits 120 and 122 also extend from passages 80 and 90, respectively, to provide hydraulic pressure in conduit 124.

At low RPM, before relative motion between the rotor 60 and the internal gear 46 ceases, there will be positive fluid pressure from the outer pumps through conduits 121 and 123 to piston 116. This in turn may cause the reverse drum to be locked to the rotor 60 through drum plates 103 and clutch plates 112. However, this will have no effect on the transmission since the reverse drum is free to rotate except when clamped by the reverse band.

FIG. 4 comprises a continuation of FIG. 3, illustrating further the hydraulic system of the apparatus. When shift lever 50 is moved to the reverse position, valve 126 is opened to allow fluid pressure from conduit 124 to flow through conduit 128 into cylinder 106. Piston 108 in the cylinder moves piston rod 109 and reverse band 104, as previously described, to clamp the reverse drum (see FIG. 2).

Thus there has been disclosed a new and useful automatic transmission which is variable in ratio between a driving member and a driven member without the encumbrances of fixed gear ratios and which has few moving parts. While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. An automatic transmission, comprising, in combination:

housing means;

an input shaft extending into said housing means and journalled for rotation therein;

a plurality of splines on said input shaft;

an internally splined drive gear movable on the splines of said input shaft;

a rotor in the housing;

a first and a second idler gear rotably journalled in said rotor and disposed diametrically about said input shaft and coupled to the driven gear;

pump means, including first, second, third, and fourth pump chambers in said rotor defined by said drive gear and said idler gears for providing a first flow of fluid from said chamber and a second flow of fluid from said third chamber in response to rotation of the input shaft and the drive gear coupled thereto to cause rotation of said rotor;

first fluid passage means in said rotor extending between the first chamber and the second chamber for providing a flow of fluid between the first and the second chambers;

means for restricting the flow of fluid through the first fluid passage means in response to rotation of the rotor;

second fluid passage means in said rotor means between said third chamber and said fourth chamber for providing a flow of fluid between the third and the fourth chambers;

means for restricting the flow of fluid through the second fluid passage means in response to rotation of the rotor;

an internal gear rotable in the housing and meshing with the first and second idler gears and movable therewith in response to movement of the rotor; and an output member secured to and movable with the internal gear.

2. The apparatus of claim 1 in which the first and the second fluid passage means each include a cross passage extending across each passage radially aligned with the input shaft.

3. The apparatus of claim 1 in which the means for restricting the flow of fluid in the first and second fluid passage means includes restrictor means in the respective cross passages and movable in response to rotation of the rotor.

4. The apparatus of claim 3 in which each restrictor means includes a relieved portion movable into and out of engagement with the fluid passages to vary the flow of fluid through the passages.

5. The apparatus of claim 4 in which the pump means further includes:

fifth and sixth pump chambers in said rotor defined by the first idler gear and the internal gear;

third fluid passage means for transferring a flow of fluid between the fifth and sixth chambers;

seventh and eighth pump chambers in said rotor defined by the second idler gear and the internal gear; and fourth fluid passage means for transferring a flow of fluid between the fifth and sixth chambers.

6. The apparatus of claim 5 in which the housing means includes:
- a shift lever pivotal on the housing and secured to the input shaft for moving the output shaft axially on its splines to a reverse position;
- a reverse band secured to the housing and movable therewith;
- a piston in the rotor;
- means for providing a flow of fluid from the third fluid passage and the fourth fluid passage to the piston in the rotor;
- a reverse drum coaxial with the rotor and rotable therewith;
- a plurality of brake bands on the reverse drum coaxial with said rotor;
- a plurality of clutch bands on the rotor coaxial with the rotor and interleaved with the plurality of brake bands secured to said reverse drum, and movable into engagement with said brake bands in response to movement of said piston in said rotor to secure the rotor to the reverse drum;
- piston means for moving the reverse band into clamping engagement with the reverse drum to prevent movement of the reverse drum when the reverse drum is secured to the rotor to prevent movement of the rotor;
- bypass means in said rotor and on said input shaft to allow unrestricted circulation of fluid between said first and second pumping chamber and said third and fourth pumping chambers when the shift lever moves the input shaft to a reverse position; and
- valve means connected to the shift lever to provide a flow of fluid from the third and the fourth fluid passages to the piston means for moving the reverse band into clamping engagement with the reverse drum when the shift lever is moved to the reverse position.

* * * * *